(12) United States Patent
Taniguchi

(10) Patent No.: US 10,882,358 B2
(45) Date of Patent: Jan. 5, 2021

(54) PNEUMATIC TIRE FOR A MOTORCYCLE

(71) Applicant: SUMITOMO RUBBER INDUSTRIES, LTD., Kobe (JP)

(72) Inventor: Toyoto Taniguchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 245 days.

(21) Appl. No.: 15/788,038

(22) Filed: Oct. 19, 2017

(65) Prior Publication Data

US 2018/0126788 A1    May 10, 2018

(30) Foreign Application Priority Data

Nov. 10, 2016 (JP) .................................. 2016-219855

(51) Int. Cl.
*B60C 11/00* (2006.01)
*B60C 9/20* (2006.01)
*B60C 9/22* (2006.01)

(52) U.S. Cl.
CPC ........ *B60C 11/0041* (2013.01); *B60C 11/005* (2013.01); *B60C 11/0058* (2013.01);
(Continued)

(58) Field of Classification Search
CPC ............. B60C 11/0008; B60C 11/0041; B60C 11/005; B60C 11/0058; B60C 11/0075;
(Continued)

(56) References Cited

U.S. PATENT DOCUMENTS

| 2005/0282944 A1* | 12/2005 | Minakoshi | ............... B60C 11/14 524/430 |
| 2008/0216930 A1* | 9/2008 | Valentine | ................ B60C 11/00 152/209.5 |

(Continued)

FOREIGN PATENT DOCUMENTS

| EP | 0565339 A1 * | 10/1993 | ............... B60C 9/22 |
| JP | 2003-276404 A | 9/2003 | |

(Continued)

OTHER PUBLICATIONS

Takuro Matsumoto, JP-2014231322-A, machine translation. (Year: 2014).*

(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

A pneumatic tire for a motorcycle includes a tread reinforcing cord layer and a tread rubber. The tread rubber includes a base rubber layer and a pair of shoulder rubber layers. The base rubber layer includes a cover portion covering at least the tread reinforcing cord layer over an entire width thereof and a convex portion protruding radially outwardly from the cover portion to form a crown ground contacting surface. The shoulder rubber layers are arranged radially outside the cover portion to form shoulder ground contacting surfaces. The base rubber layer is made of a first rubber composition having larger hardness than the shoulder rubber layers, and the shoulder rubber layers are made of a second rubber composition containing larger amount of oil component than the base rubber layer.

17 Claims, 2 Drawing Sheets

(52) U.S. Cl.
CPC ....... *B60C 11/0075* (2013.01); *B60C 11/0008* (2013.01); *B60C 2009/2087* (2013.01); *B60C 2009/2271* (2013.01); *B60C 2200/10* (2013.01)

(58) Field of Classification Search
CPC .... B60C 2009/2077; B60C 2009/2083; B60C 2009/2087; B60C 2009/2257; B60C 2009/2266; B60C 2009/2271; B60C 2200/10; B60C 1/0016; B60C 2001/0083; B60C 9/00; B60C 9/18; B60C 9/1835; B60C 2011/016
USPC ...................................................... 152/209.5
See application file for complete search history.

(56) References Cited

U.S. PATENT DOCUMENTS

| | | | | |
|---|---|---|---|---|
| 2008/0271830 | A1* | 11/2008 | Suzuki | B60C 9/2009 |
| | | | | 152/527 |
| 2010/0132862 | A1* | 6/2010 | Terada | B60C 11/00 |
| | | | | 152/209.5 |
| 2011/0120613 | A1* | 5/2011 | Yoshinaka | B29D 30/60 |
| | | | | 152/526 |
| 2013/0167993 | A1* | 7/2013 | Otani | B60C 11/00 |
| | | | | 152/209.1 |
| 2013/0299054 | A1* | 11/2013 | Kajimoto | B60C 11/005 |
| | | | | 152/209.18 |
| 2014/0202605 | A1* | 7/2014 | Saiwaki | B60C 11/005 |
| | | | | 152/209.5 |
| 2015/0210120 | A1* | 7/2015 | Matsunami | B60C 9/18 |
| | | | | 152/527 |
| 2017/0152373 | A1* | 6/2017 | Kim | C08K 3/04 |

FOREIGN PATENT DOCUMENTS

| | | | | |
|---|---|---|---|---|
| JP | 2005271760 | A | * 10/2005 | ......... B60C 11/0058 |
| JP | 2013-226933 | A | 11/2013 | |
| JP | 2014231322 | A | * 12/2014 | |

OTHER PUBLICATIONS

Shu Yoshida, JP-2005271760-A, machine translation. (Year: 2005).*
Extended European Search Report, dated Mar. 22, 2018, for European Application No. 17198429.7.

\* cited by examiner

PNEUMATIC TIRE FOR A MOTORCYCLE

TECHNICAL FIELD

The present invention relates to a pneumatic tire for a motorcycle having excellent durability and steering stability.

BACKGROUND ART

Conventionally, in order to improve the steering stability including grounding feeling during cornering, slide controllability and transient characteristics, it is known to increase amount of oil component in a shoulder rubber layer of a tread rubber that contacts the ground while cornering. In such a pneumatic tire for a motorcycle, grip force while cornering is increased by the shoulder rubber layer, therefore, excellent steering stability is exerted.

Unfortunately, in this type of pneumatic tire for a motorcycle, the oil component of the shoulder rubber layer permeates to a tread reinforcing cord layer in contact with the shoulder rubber layer on an inner side in a tire radial direction, and it is possible that the shoulder rubber layer and the tread reinforcing cord layer are separated. As described above, it is possible that a pneumatic tire for a motorcycle including a shoulder rubber layer having a large amount of oil component exerts excellent steering stability but the durability tends to deteriorate.

SUMMARY OF THE INVENTION

The present invention was made in view of the above, and a primary object thereof is to provide a pneumatic tire for a motorcycle having excellent durability and steering stability by improving the tread rubber.

The pneumatic tire for a motorcycle according to the present invention comprises a carcass extending between a pair of bead cores, a tread reinforcing cord layer arranged on an outer side of the carcass in a tire radial direction, and a tread rubber arranged on the outer side of the tread reinforcing cord layer in the tire radial direction, the tread rubber forming a ground contacting surface including a crown ground contacting surface for contacting with the ground during straight running, and a pair of shoulder ground contacting surfaces for contacting with the ground during cornering, wherein the tread rubber comprises a base rubber layer and a pair of shoulder rubber layers, the base rubber layer comprises a cover portion covering at least the tread reinforcing cord layer over an entire width thereof and a convex portion protruding radially outwardly from the cover portion so as to form the crown ground contacting surface, the shoulder rubber layers are arranged on the radially outer side of the cover portion so as to form the shoulder ground contacting surfaces, the base rubber layer is made of a first rubber composition having larger hardness than the shoulder rubber layers, and the shoulder rubber layers are made of a second rubber composition containing larger amount of oil component than the base rubber layer.

It is preferred that the convex portion of the base rubber layer has a width in a tire axial direction gradually increasing radially inwardly.

It is preferred that on each side of a tire equator, a boundary surface between the convex portion and one of the shoulder rubber layers is inclined at an angle in a range of from 40 to 70 degrees with respect to the tire radial direction in a tire meridian section including a tire rotational axis.

It is preferred that the axial width of the convex portion in the ground contacting surface is in a range of from 0.1 to 0.4 times a tread width.

It is preferred that the tread reinforcing cord layer includes a band layer of reinforcing cords extending in a tire circumferential direction and arranged in the tire axial direction with variable cord density, and the cord density is lower in an area radially inside the convex portion of the base rubber layer than in areas on both sides thereof in the tire axial direction.

DESCRIPTION OF THE PREFERRED EMBODIMENT

An embodiment of the present invention will now be described in conjunction with accompanying drawings.

Figure 1:
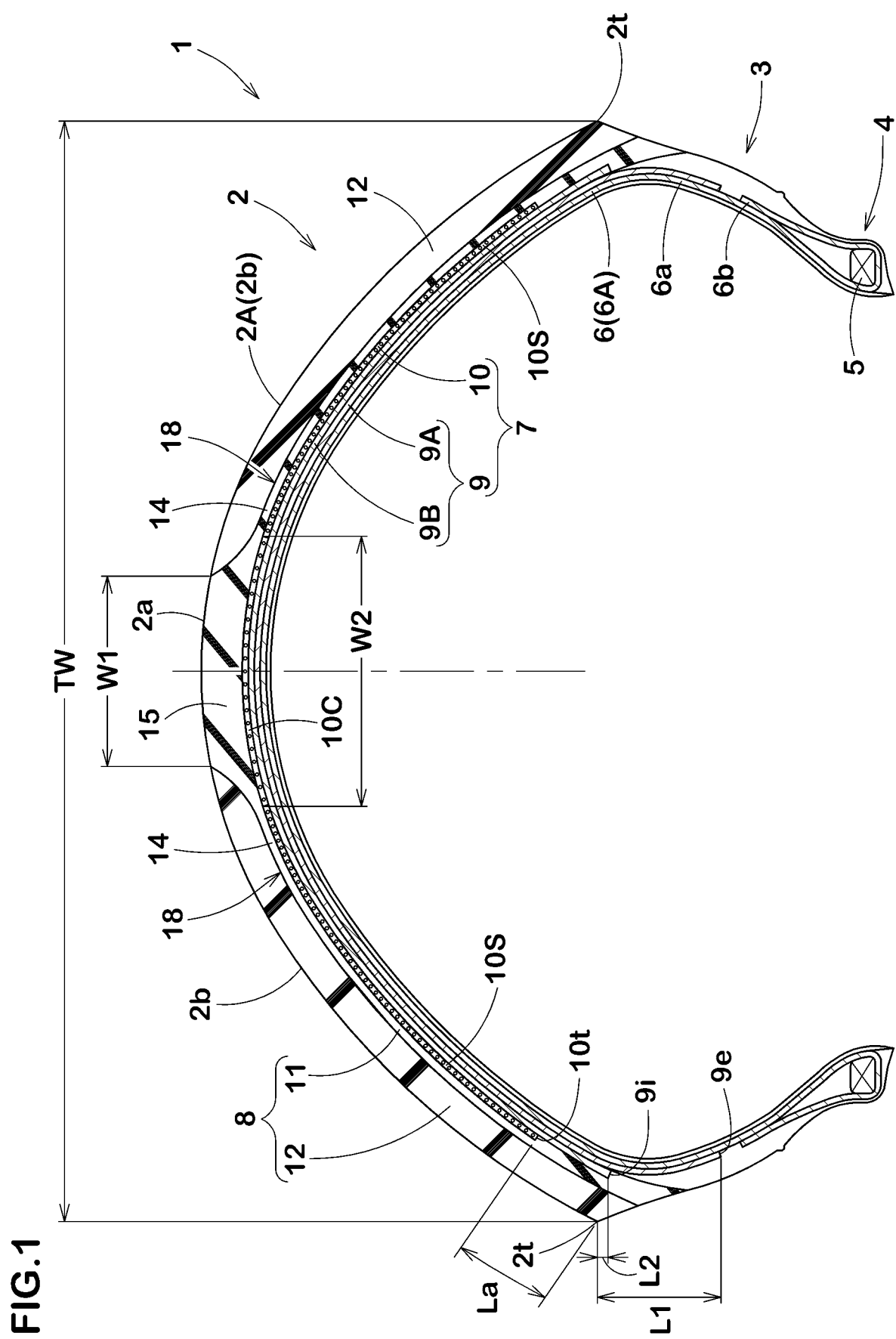
FIG. 1 is a tire meridian section of a tire for a motorcycle as an embodiment of the present invention.

FIG. 1 is a tire meridian section including a tire rotational axis (not shown) of a pneumatic tire for a motorcycle (hereinafter may be simply referred to as "tire") 1 in this embodiment in a standard state. The standard state is a state in which a tire 1 is mounted on a standard rim (not shown) and inflated to a standard pressure with no tire load. In this specification, sizes and the like of various parts of the tire are those measured in the standard state unless otherwise noted. The present invention is suitably applied, for example, to a tire 1 suitable for running on a paved road.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The tire 1 includes a tread portion 2 having a ground contacting surface 2A which is an outer surface between tread edges (2t), a pair of sidewall portions 3 extending inwardly in a tire radial direction from both sides of the tread portion 2 in a tire axial direction, and bead portions 4 each arranged on an inner side of each of the sidewall portions 3 in the tire radial direction. The bead portions 4 are to be mounted on a rim (not shown).

In the tire 1, the ground contacting surface 2A of the tread portion 2 is curved in an arc shape protruding outward in the tire radial direction. The tire 1 configured as such can obtain a sufficient contact area even during cornering with a large camber angle. A distance between the tread edges (2t) in the tire axial direction is a tread width (TW), which is a maximum width of the tire.

The tire 1 in this embodiment includes a carcass 6, a tread reinforcing cord layer 7 disposed on a radially outer side of the carcass 6, and a tread rubber 8 arranged on the radially outer side of the tread reinforcing cord layer 7.

The carcass 6 in this embodiment is composed of one carcass ply 6A. The carcass ply 6A includes a main body portion (6a) and turned up portions (6b). The main body portion (6a) extends between bead cores 5 of the bead portions 4 via the tread portion 2 and the sidewall portions 3, for example. The turned up portions (6b) extend from both ends of the main body portion (6a) in the tire axial direction and are each turned up around one of the bead cores 5 from inside to outside in the tire axial direction, for example.

The carcass ply 6A is a cord ply in which carcass cords are covered with topping rubber. The carcass cords are arranged at an angle in a range, for example, of from 70 to 90 degrees with respect to a tire equator (C). For the carcass cords, organic fibers are suitably used, and examples thereof are selected from aramid, polyethylene naphthalate (PEN), nylon, rayon and the like.

The tread rubber 8 in this embodiment includes a crown ground contacting surface (2a) for contacting with the ground during straight running and a pair of shoulder ground contacting surfaces (2b) for contacting with the ground during cornering. In this specification, the shoulder ground contacting surfaces (2b) are a pair of surfaces arranged on both outer sides in the tire axial direction of the crown ground contacting surface (2a).

The tread rubber 8 in this embodiment includes a base rubber layer 11 and a pair of shoulder rubber layers 12.

The base rubber layer 11 in this embodiment comprises a cover portion 14 covering at least the tread reinforcing cord layer 7 over an entire width thereof and a convex portion 15 protruding radially outwardly from the cover portion 14 so as to form the crown ground contacting surface (2a).

The cover portion 14 in this embodiment extends to both tread ends (2t) and forms a part of an outer surface of the tire 1.

The convex portion 15 in this embodiment is a continuous part of the base rubber layer having rubber thickness not less than rubber thickness (t2) which is 1.1 times minimum rubber thickness (t1) (shown in FIG. 2) of the cover portion 14, and including the tire equator (C).

The base rubber layer 11 is made of a first rubber composition having larger hardness than the shoulder rubber layers 12. The base rubber layer 11 configured as such effectively increases rigidity of the convex portion 15 including the crown ground contacting surface (2a) which is more likely to contact with the ground during running, therefore, anti-wear performance and straight running stability are improved.

The shoulder rubber layers 12 in this embodiment are arranged on the outer side in the tire radial direction of the cover portion 14 so as to form the shoulder ground contacting surface (2b). Each of the shoulder rubber layers 12 in this embodiment extends to one of the tread edges (2t).

The shoulder rubber layers 12 are made of a second rubber composition containing larger amount of oil component than the base rubber layer 11. With the shoulder rubber layers 12 configured as such, the shoulder ground contacting surfaces (2b), which are to contact with the ground during cornering, exert a high grip force, therefore, steering stability is improved. Further, the base rubber layer 11 is arranged radially inside the shoulder rubber layers 12, thus, the oil component in the shoulder rubber layers 12 is blocked by the base rubber layer 11, therefore, the oil component is prevented from permeating into the tread reinforcing cord layer 7. Thereby, separation between the tread rubber 8 and the tread reinforcing cord layer 7 is suppressed, therefore, durability of the tire 1 is improved.

It is preferred that an amount B2 of the oil component in the second rubber composition is larger by 1 to 10 parts by mass than an amount B1 of the oil component in the first rubber composition with respect to 100 parts by mass of rubber component. If the amount B2 of the second rubber composition is larger than the amount B1 of the first rubber composition by more than 10 parts by mass with respect to 100 parts by mass of rubber component, it is possible that the permeation of the oil component cannot be suppressed. If a difference between the amount B2 of the second rubber composition and the amount B1 of the first rubber composition is less than 1 part by mass with respect to 100 parts by mass of rubber component, it is possible that the grip force during cornering cannot be improved. Thereby, it is preferred that the amount B1 of the oil component in the first rubber composition is in a range of from 17 to 37 parts by mass with respect to 100 parts by mass of rubber component in the first rubber composition. It is preferred that the amount B2 of the oil component in the second rubber composition is in a range of from 19 to 39 parts by mass with respect to 100 parts by mass of rubber component in the second rubber composition. In this specification, the amount of the oil component in each of the first rubber composition and the second rubber composition does not include an amount of extending oil when the rubber component is an oil-extended rubber.

Examples of the oil component include process oils, vegetable oils and fats, animal fats and oils and the like. Of these, process oils are preferred because they are advantageous for processability, and examples of process oils include paraffin-based process oil, naphthene-based process oil, aromatic process oil, and the like.

It is preferred that hardness H1 of the first rubber composition is larger than hardness H2 of the second rubber composition by 2 to 8 degrees. If the hardness H1 of the first rubber composition is larger than the hardness H2 of the second rubber composition by more than 8 degrees, rigidity difference of the tread portion 2 becomes large, therefore, it is possible that the steering stability is deteriorated. If a difference between the hardness H1 of the first rubber composition and the hardness H2 of the second rubber composition is less than 2 degrees, it is possible that the straight running stability is deteriorated. Further, the grip force during cornering becomes small, therefore, it is possible that the steering stability is rather deteriorated. Thereby, it is preferred that the hardness H1 of the first rubber composition is in a range of from 58 to 70 degrees, for example. It is preferred that the hardness H2 of the second rubber composition is in a range of from 53 to 68 degrees, for example. In this specification, the "hardness" is rubber hardness measured by a type-A durometer under temperature of 23 degrees Celsius according to Japanese Industrial Standard JIS-K6253.

A width W1 in the tire axial direction of the convex portion 15 of the base rubber layer 11 in this embodiment gradually increases toward the inner side in the tire radial direction. With the convex portion 15 configured as such, rubber volume of the first rubber composition gradually decreases toward the outer side in the tire axial direction, therefore, change in rigidity of the tread rubber 8 is decreased between the crown ground contacting surface (2a) and the shoulder ground contacting surface (2b). Thereby, transient characteristics, slide controllability, grounding feeling, etc. are improved, therefore, the steering stability is improved. Further, the convex portion 15 configured as such decreases stress applied to the cover portion 14, therefore, rigidity of the base rubber layer 11 in the crown ground contacting surface (2a) is maintained high, thereby, the durability, the anti-wear performance, and the straight running stability are improved.

In the tread rubber 8 in this embodiment, the base rubber layer 11 and each of the shoulder rubber layers 12 are in contact with each other to form a boundary surface 18 between the base rubber layer 11 and each of the shoulder rubber layers 12. The boundary surfaces 18 in this embodiment extend axially outwardly from both sides in the tire axial direction of the crown ground contacting surface (2a).

Figure 2:
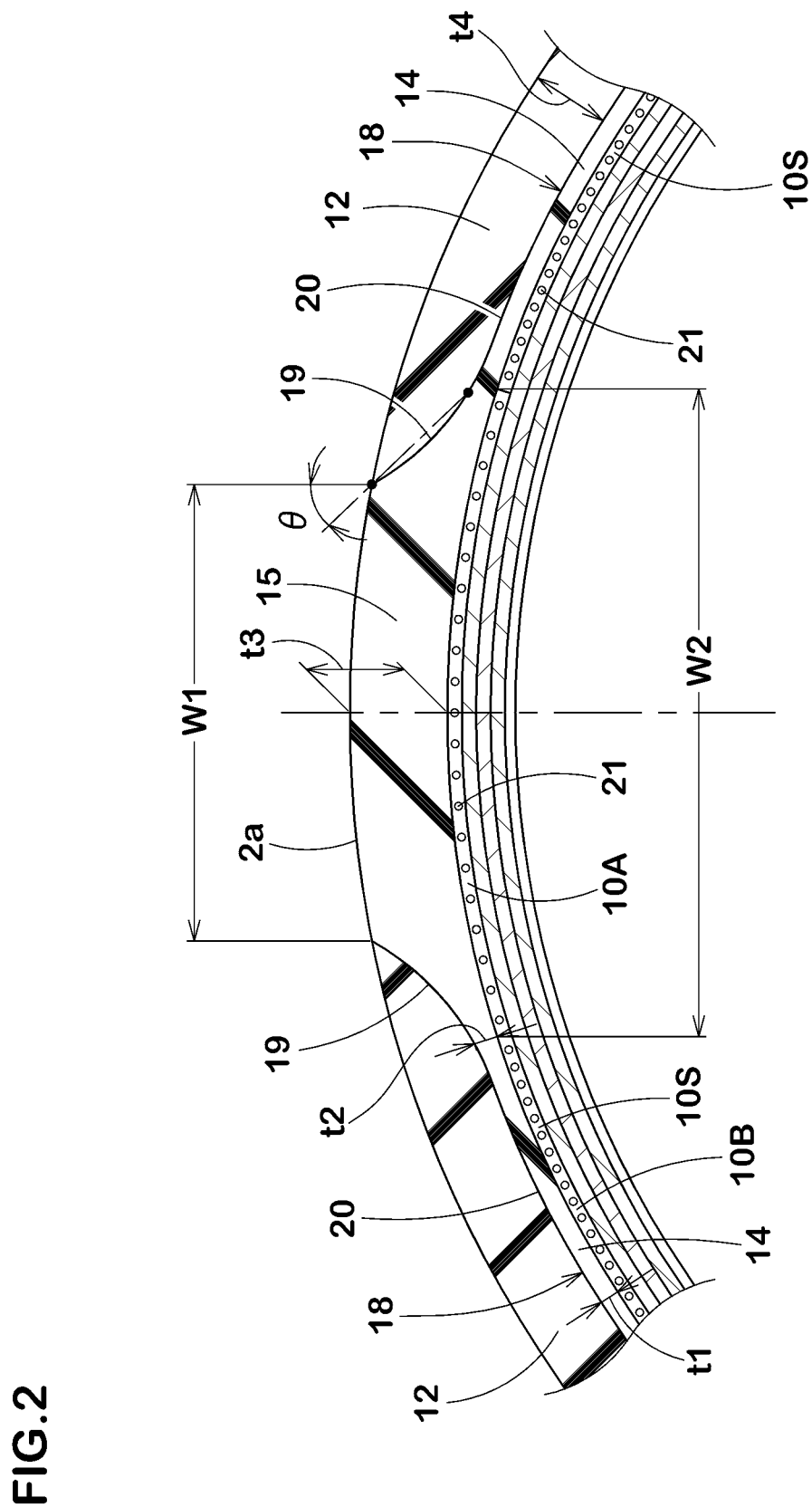
FIG. 2 is an enlarged view of a convex portion of FIG. 1.

As shown in FIG. 2, each of the boundary surfaces 18 includes a first surface portion 19 where the convex portion 15 and one of the shoulder rubber layers 12 are in contact, and a second surface portion 20, where the cover portion 14 and one of the shoulder rubber layers 12 are in contact, located on the outer side of the first surface portion 19 in the tire axial direction.

It is preferred that the first surface portions 19 are inclined at angles θ in a range of from 40 to 70 degrees with respect to the tire radial direction. If the angles θ are less than 40 degrees, the rigidity change of the tread rubber 8 becomes large between the crown ground contacting surface (2a) and each of the shoulder ground contacting surfaces (2b), therefore, it is possible that the steering stability is deteriorated. If the angles θ are larger than 70 degrees, rubber volume of portions of the shoulder rubber layers 12 adjacent to the crown ground contacting surface (2a) becomes excessively small, thus the grip force of the portions adjacent to the crown ground contacting surface (2a) cannot be effectively increased, therefore, it is possible that the steering stability is deteriorated. Thereby, it is further preferred that the angles θ are in a range of from 45 to 60 degrees.

It is not particularly limited but the second surface portions 20 in this embodiment extend smoothly along the shoulder ground contacting surfaces (2b).

It is preferred that the width W1 in the tire axial direction of the convex portion 15 in the crown ground contacting surface (2a) is in a range of from 0.1 to 0.4 times the tread width (TW). If the width W1 of the convex portion 15 is less than 0.1 times the tread width (TW), rubber volume of the convex portion 15 becomes small, therefore, it is possible that the durability cannot be improved. If the width W1 of the convex portion 15 is greater than 0.4 times the tread width (TW), the rubber volume of the shoulder rubber layers 12 becomes excessively small, therefore, it is possible that the grip force during cornering is deteriorated.

It is preferred that maximum rubber thickness (t3) of the base rubber layer 11 is in a range of from 1.1 to 1.4 times maximum rubber thickness (t4) of the shoulder rubber layers 12. If the rubber thickness (t3) of the base rubber layer 11 is less than 1.1 times the rubber thickness (t4) of the shoulder rubber layers 12, the minimum rubber thickness (t1) of the cover portion 14 becomes excessively small, therefore, it is possible that the permeation of the oil component of the second rubber composition into the tread reinforcing cord layer 7 cannot be suppressed. If the rubber thickness (t3) of the base rubber layer 11 is greater than 1.4 times the rubber thickness (t4) of the shoulder rubber layers 12, the rubber thickness (t4) of the shoulder rubber layers 12 becomes small, therefore, it is possible that the grip force during cornering cannot be increased.

As shown in FIG. 1, the tread reinforcing cord layer 7 in this embodiment comprises a belt layer 9 disposed on the outer side in the tire radial direction of the carcass 6, and a band layer 10 disposed on the outer side in the tire radial direction of the belt layer 9.

The belt layer 9 comprises at least one belt ply, in which belt cords are arranged, two belt plies 9A and 9B in this embodiment. The belt ply 9B is arranged on the radially outer side of the belt ply 9A. The belt ply 9B is overlapped with the belt ply 9A so that the belt cords of the belt ply 9A and 9B intersect each other. As the belt cords, for example, steel cords or organic fiber are suitably used.

The inner belt ply 9A in this embodiment has a width in the tire axial direction larger than that of the outer belt ply 9B. Outer ends (9e) in the tire axial direction of the inner belt ply 9A in this embodiment are located on the radially inner side of the tread edges (2t), respectively. The belt layer 9 configured as such can effectively increase rigidity of portions of the tread portion 2 around the tread edges 2t. Outer ends (9i) in the tire axial direction of the outer belt ply 9B in this embodiment are located on the radially inner side of the tread edges (2t) as well, therefore, the rigidity of the portions of the tread portion 2 around the tread edges 2t is further maintained high. Note that the belt layer 9 is not limited to such configuration, and can be configured in various forms.

In order to effectively exert the above described effects, it is preferred that distance L1 in the tire radial direction between the outer ends (9e) of the inner belt ply 9A and the tread edges (2t) is in a range of from 5% to 15% of the tread width (TW). Further, it is preferred that distance L2 in the tire radial direction between the outer ends (9i) of the outer belt ply 9B and the tread edges (2t) is not greater than 18% of the distance L1 in the tire radial direction between the outer ends (9e) of the inner belt ply 9A and the tread edges (2t).

The band layer 10 in this embodiment comprises a band ply 10B (shown in FIG. 2) comprising at least one, one in this embodiment, jointless ply 10A (shown in FIG. 2) formed by winding one or a plurality of rubber-coated band cords 21. It is preferred that the band cords 21 are spirally wound at an angle smaller than 5 degrees with respect to a tire circumferential direction, for example.

The band layer 10 configured as such can suppress amount of protrusion of the tread portion 2 during running at high speed, and is useful for improving high-speed durability and uniformity of the tire 1. As the band cords 21, for example, organic fiber cords such as aramid, nylon, polyester, rayon, etc., and steel cords are suitably used, and aramid cords are used in this embodiment.

It is preferred that length (La) along the ground contacting surface 2A between each of outer ends (10t) in the tire axial direction of the band layer 10 and each corresponding one of the tread edges (2t) is not less than 20 mm. Thereby, the rigidity of the tread portion 2 in the vicinity of the tread edges (2t) is not excessively increased, and the rigidity difference is decreased, therefore, the steering stability is maintained high. In order to effectively improve the steering stability, it is preferred that the length (La) is not greater than 40 mm.

The band layer 10 in this embodiment includes a crown portion 10C formed in an area radially inside the convex portion 15 of the base rubber layer 11, and a pair of shoulder portions 10S formed in areas located on both sides in the tire axial direction of the crown portion 10C.

It is preferred that cord density E1 of the band cords 21 of the crown portion 10C is smaller than cord density E2 of the band cords 21 of the shoulder portions 10s. The band layer 10 configured as such has relatively small cord density E1 of the crown portion 10C, therefore, it allows deflection of the tread portion 2 during running when the convex portion 15 contacts the ground, thereby, it is possible that shock absorbing property is improved. On the other hand, the shoulder portions 10s are configured to have relatively large cord density E2, therefore, ground contacting pressure of the tread portion 2 is increased during running when the shoulder rubber layers 12 contact the ground. Further, the shoulder portions 10S can suppress decrease in the rigidity of the tread portion 2 by the shoulder rubber layers 12. The rigidity of the tread portion 2 having the shoulder ground contacting surfaces (2*b*) tends to be relatively small. Thereby, change in the rigidity of the tread portion 2 is decreased over the inside and the outside in the tire axial direction, thus, the grounding feeling, the slide controllability and the transient characteristic are greatly improved, therefore, the steering stability is greatly improved.

In order to effectively exert such effects, it is preferred that ratio (E1/E2) of the cord density E2 of the shoulder portions 10S and the cord density E1 of the crown portion 10C is in a range of from 0.65 to 0.85. It is preferred that the cord density E1 of the crown portion 10C is in a range of from 20 to 65. It is preferred that the cord density E2 of the shoulder portions 10S is in a range of from 25 to 70. In this specification, the cord density is the number of the band cords 21 per unit width (5 cm) of the band ply 10B.

In order to exert the above-described effects more effectively, it is preferred that width W2 of the crown portion 10C in the tire axial direction is in a range of from 0.9 to 1.8 times the width W1 of the crown ground contacting surface (2*a*) of the convex portion 15.

While detailed description has been made of the pneumatic tire as an embodiment of the present invention, the present invention can be embodied in various forms without being limited to the illustrated embodiment.

Working Example (Example)

Pneumatic tires for a motorcycle of size 200/60R420 having the basic structure shown in FIG. 1 were made by way of test according to the specifications listed in Table 1, and then each of the test tires was tested for the durability and the steering stability. Common specifications and test methods of the test tires are as follows.

Width W1 of the convex portion of the crown ground contacting surface/tread width TW: 12%

Cord density of the crown portion: 26 (cords per 5 cm)

<Steering Stability, Straight Running Stability>

Each of the test tires was mounted on rear wheel of a test motorcycle, and then the test motorcycle was driven on a dry asphalt road surface of a test course. The transient characteristics, the slide controllability, the grounding feeling, etc. were evaluated by the driver's feeling upon changing from straight running to cornering and from cornering to straight running. The tire mounted on the front wheel was the same. The test results are indicated by an evaluation point based on Reference 1 being 100, wherein the larger the numerical value, the better the steering stability and the straight running are.

Test motorcycle: motorcycle for road racing with displacement of 1000 cc

Tire pressure: 150 kPa (rear wheel)

<Durability>

Test tires were run on a well-known drum testing machine under the following conditions. After the run, separation between the tread rubber and the tread reinforcing cord layer and permeation of the oil into the tread rubber were confirmed visually by the test performer. The durability was evaluated by the test performer's feeling and the larger the numerical value, the better.

Tire load: 3.58 KN

Speed: 80 km/h

Running time: 300 hours

The test results are shown in Table 1.

TABLE 1

|  | Ref. 1 | Ex. 1 | Ex. 2 | Ex. 3 | Ex. 4 | Ex. 5 | Ref. 2 | Ref. 3 | Ref. 4 | Ex. 6 | Ex. 7 |
|---|---|---|---|---|---|---|---|---|---|---|---|
| Amount B1 of Oil component in First rubber composition [parts by mass] | 34 | 32 | 15 | 18 | 32 | 32 | 23 | 32 | 32 | 32 | 32 |
| Amount B2 of Oil component in Second rubber composition [parts by mass] | 34 | 34 | 20 | 20 | 37 | 43 | 23 | 34 | 34 | 34 | 34 |
| Hardness H1 of First rubber composition [degree] | 60 | 64 | 64 | 64 | 64 | 64 | 64 | 60 | 64 | 64 | 64 |
| Hardness H2 of Second rubber composition [degree] | 60 | 60 | 60 | 60 | 60 | 60 | 60 | 60 | 64 | 60 | 60 |
| Angles θ of First surface portions [degree] | 50 | 50 | 50 | 50 | 50 | 50 | 50 | 50 | 50 | 35 | 40 |
| Width W2 of Crown portion/Width W1 of Crown ground contacting surface | 1.5 | 1.5 | 1.5 | 1.5 | 1.5 | 1.5 | 1.5 | 1.5 | 1.5 | 1.5 | 1.5 |
| Ratio E1/E2 of Cord density | 0.74 | 0.74 | 0.74 | 0.74 | 0.74 | 0.74 | 0.74 | 0.74 | 0.74 | 0.74 | 0.74 |
| Steering stability [Evaluation point: larger is better] | 100 | 110 | 105 | 107 | 110 | 113 | 96 | 98 | 95 | 107 | 109 |
| Durability [Evaluation point: larger is better] | 100 | 120 | 120 | 120 | 117 | 113 | 100 | 110 | 110 | 118 | 120 |
| Straight running stability [Evaluation point: larger is better] | 100 | 115 | 115 | 115 | 115 | 114 | 103 | 96 | 98 | 113 | 114 |

|  | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Amount B1 of Oil component in First rubber composition [parts by mass] | 32 | 32 | 32 | 32 | 32 | 32 | 32 | 32 | 32 | 32 |
| Amount B2 of Oil component in Second rubber composition [parts by mass] | 34 | 34 | 34 | 34 | 34 | 34 | 34 | 34 | 34 | 34 |
| Hardness H1 of First rubber composition [degree] | 64 | 64 | 64 | 64 | 64 | 64 | 64 | 64 | 64 | 64 |

TABLE 1-continued

| | | | | | | | | | | |
|---|---|---|---|---|---|---|---|---|---|---|
| Hardness H2 of Second rubber composition [degree] | 60 | 60 | 60 | 60 | 60 | 60 | 60 | 60 | 60 | 60 |
| Angles θ of First surface portions [degree] | 70 | 75 | 50 | 50 | 50 | 50 | 50 | 50 | 50 | 50 |
| Width W2 of Crown portion/ Width W1 of Crown ground contacting surface | 1.5 | 1.5 | 0.8 | 0.9 | 1.8 | 1.9 | 1.5 | 1.5 | 1.5 | 1.5 |
| Ratio E1/E2 of Cord density | 0.74 | 0.74 | 0.74 | 0.74 | 0.74 | 0.74 | 0.9 | 0.84 | 0.65 | 0.63 |
| Steering stability [Evaluation point: larger is better] | 108 | 106 | 108 | 110 | 108 | 106 | 108 | 110 | 108 | 106 |
| Durability [Evaluation point: larger is better] | 118 | 117 | 119 | 120 | 120 | 116 | 119 | 120 | 120 | 116 |
| Straight running stability [Evaluation point: larger is better] | 116 | 117 | 112 | 113 | 115 | 117 | 112 | 113 | 115 | 117 |

From the test results, it was confirmed that the durability and the steering stability of the tires as Examples were improved as compared with those of the tires as References. Further, tires of different sizes were tested, but the results were the same.

The invention claimed is:

1. A pneumatic tire for a motorcycle comprising:
a carcass extending between a pair of bead cores,
a tread reinforcing cord layer arranged outside the carcass in a tire radial direction,
a tread rubber arranged radially outside the tread reinforcing cord layer, the tread rubber forming a ground contacting surface including a crown ground contacting surface for contacting with the ground during straight running, and a pair of shoulder ground contacting surfaces for contacting with the ground during cornering, and
a pair of sidewall portions extending inwardly in the tire radial direction from the tread rubber, a portion of each of the pair of sidewall portions being arranged between the tread reinforcing cord layer and the tread rubber in a tire axial direction,
wherein
the tread rubber comprises a base rubber layer and a pair of shoulder rubber layers,
the base rubber layer comprises a cover portion covering at least the tread reinforcing cord layer over an entire width thereof and a convex portion protruding radially outwardly from the cover portion so as to form the crown ground contacting surface,
a width, in the tire axial direction, of the convex portion in the ground contacting surface is in a range of from 0.1 to 0.4 times a tread width, and a thickness of the cover portion that extends from the convex portion to tread edges is consistently smaller than a thickness of the pair of shoulder rubber layers,
the shoulder rubber layers are arranged radially outside the cover portion so as to form the shoulder ground contacting surfaces,
the base rubber layer is made of a first rubber composition, a hardness of the first rubber composition being larger than a hardness of the shoulder rubber layers,
the shoulder rubber layers are made of a second rubber composition, an amount of oil component contained in the second rubber composition being larger than an amount of oil component contained in the base rubber layer,
the amount of oil component in the second rubber composition is larger by 1 to 10 parts by mass than an amount of oil component in the first rubber composition with respect to 100 parts by mass of a rubber component,
the tread reinforcing cord layer includes a band layer of reinforcing cords extending in a tire circumferential direction and arranged in the tire axial direction with variable cord density,
the cord density is lower in an area radially inside the convex portion of the base rubber layer than in areas on both sides thereof in the tire axial direction,
the band layer comprises at least one jointless ply formed by winding one or a plurality of rubber-coated band cords,
the band cords are spirally wound at an angle smaller than 5 degrees with respect to the tire circumferential direction, and
a length along the ground contacting surface between each of outer ends in the tire axial direction of the band layer and a respective one of tread edges is not less than 20 mm.

2. The pneumatic tire for a motorcycle according to claim 1, wherein
the convex portion of the base rubber layer has the width in the tire axial direction gradually increasing radially inwardly.

3. The pneumatic tire for a motorcycle according to claim 2, wherein
on each side of a tire equator, a boundary surface between the convex portion and one of the shoulder rubber layers is inclined at an angle in a range of from 40 to 70 degrees with respect to the tire radial direction in a tire meridian section including a tire rotational axis.

4. The pneumatic tire for a motorcycle according to claim 1, wherein
the amount of the oil component in the first rubber composition is in a range of from 17 to 37 parts by mass with respect to 100 parts by mass of the rubber component in the first rubber composition, and
the amount of the oil component in the second rubber composition is in a range of from 19 to 39 parts by mass with respect to 100 parts by mass of the rubber component in the second rubber composition.

5. The pneumatic tire for a motorcycle according to claim 1, wherein
the hardness of the first rubber composition is in a range of from 58 to 70 degrees,
a hardness of the second rubber composition is in a range of from 53 to 68 degrees, and the hardness of the first rubber composition is larger than the hardness of the second rubber composition by 2 to 8 degrees.

6. The pneumatic tire for a motorcycle according to claim 1, wherein
the convex portion has a rubber thickness not less than 1.1 times a minimum rubber thickness of the cover portion.

7. The pneumatic tire for a motorcycle according to claim 1, wherein
a maximum rubber thickness of the base rubber layer is in a range of from 1.1 to 1.4 times a maximum rubber thickness of the shoulder rubber layers.

8. The pneumatic tire for a motorcycle according to claim 1, wherein
the tread reinforcing cord layer includes a belt layer,
the belt layer comprises an inner belt ply and an outer belt ply arranged radially outside the inner belt ply, and
the inner belt ply has a width in the tire axial direction larger than that of the outer belt ply.

9. The pneumatic tire for a motorcycle according to claim 8, wherein
outer ends in the tire axial direction of the outer belt ply are each located radially inside a respective one of tread edges.

10. The pneumatic tire for a motorcycle according to claim 8, wherein
a distance in the tire radial direction between each of outer ends of the inner belt ply and a respective one of the tread edges is in a range of from 5% to 15% of the tread width.

11. The pneumatic tire for a motorcycle according to claim 8, wherein
a distance in the tire radial direction between each of the outer ends of the outer belt ply and a respective one of the tread edges is not greater than 18% of the distance in the tire radial direction between each of the outer ends of the inner belt ply and a respective one of the tread edges.

12. The pneumatic tire for a motorcycle according to claim 1, wherein
a length between each of the outer ends in the tire axial direction of the band layer and a respective one of the tread edges is not greater than 40 mm.

13. The pneumatic tire for a motorcycle according to claim 1, wherein
a cord density of the band cords of a crown portion is smaller than a cord density of the band cords of shoulder portions.

14. The pneumatic tire for a motorcycle according to claim 13, wherein
the cord density of the shoulder portions is in a range of from 25 to 70.

15. The pneumatic tire for a motorcycle according to claim 13, wherein
a width of the crown portion in the tire axial direction is in a range of from 0.9 to 1.8 times a width of the crown ground contacting surface of the convex portion.

16. A pneumatic tire for a motorcycle comprising:
a carcass extending between a pair of bead cores,
a tread reinforcing cord layer arranged outside the carcass in a tire radial direction,
a tread rubber arranged radially outside the tread reinforcing cord layer, the tread rubber forming a ground contacting surface including a crown ground contacting surface for contacting with the ground during straight running, and a pair of shoulder ground contacting surfaces for contacting with the ground during cornering, and
a pair of sidewall portions extending inwardly in the tire radial direction from the tread rubber, a portion of each of the pair of sidewall portions being arranged between the tread reinforcing cord layer and the tread rubber in a tire axial direction,
wherein
the tread rubber comprises a base rubber layer and a pair of shoulder rubber layers,
the base rubber layer comprises a cover portion covering at least the tread reinforcing cord layer over an entire width thereof and a convex portion protruding radially outwardly from the cover portion so as to form the crown ground contacting surface,
a width, in the tire axial direction, of the convex portion in the ground contacting surface is in a range of from 0.1 to 0.4 times a tread width, and a thickness of the cover portion that extends from the convex portion to tread edges is consistently smaller than a thickness of the pair of shoulder rubber layers,
the shoulder rubber layers are arranged radially outside the cover portion so as to form the shoulder ground contacting surfaces,
the base rubber layer is made of a first rubber composition, a hardness of the first rubber composition being larger than a hardness of the shoulder rubber layers,
the shoulder rubber layers are made of a second rubber composition, an amount of oil component contained in the second rubber composition being larger than an amount of oil component contained in the base rubber layer,
the amount of oil component in the second rubber composition is larger by 1 to 10 parts by mass than an amount of oil component in the first rubber composition with respect to 100 parts by mass of a rubber component,
the hardness of the first rubber composition is in a range of from 58 to 70 degrees,
a hardness of the second rubber composition is in a range of from 53 to 68 degrees,
the hardness of the first rubber composition is larger than the hardness of the second rubber composition by 2 to 8 degrees, and
the tread width is a distance between the tread edges in the tire axial direction and is a maximum width of the tire.

17. A pneumatic tire for a motorcycle comprising:
a carcass extending between a pair of bead cores,
a tread reinforcing cord layer arranged outside the carcass in a tire radial direction,
a tread rubber arranged radially outside the tread reinforcing cord layer, the tread rubber forming a ground contacting surface including a crown ground contacting surface for contacting with the ground during straight running, and a pair of shoulder ground contacting surfaces for contacting with the ground during cornering, and
a pair of sidewall portions extending inwardly in the tire radial direction from the tread rubber, a portion of each of the pair of sidewall portions being arranged between the tread reinforcing cord layer and the tread rubber in a tire axial direction,
wherein
the tread rubber comprises a base rubber layer and a pair of shoulder rubber layers, the base rubber layer comprises a cover portion covering at least the tread reinforcing cord layer over an entire width thereof and a convex portion protruding radially outwardly from the cover portion so as to form the crown ground contacting surface, a width, in the tire axial direction, of the convex portion in the ground contacting surface is in a range of from 0.1 to 0.4 times a tread width, and a thickness of the cover portion that extends from the convex portion to tread edges is consistently smaller than a thickness of the pair of shoulder rubber layers, the shoulder rubber layers are arranged radially outside the cover portion so as to form the shoulder ground contacting surfaces, the base rubber layer is made of a first rubber composition, a hardness of the first rubber composition being larger than a hardness of the shoulder rubber layers, the shoulder rubber layers are made of a second rubber composition, an amount of oil component contained in the second rubber composition being larger than an amount of oil component contained in the base rubber layer, the amount of oil component in the second rubber composition is larger by 1 to 10 parts by mass than an amount of oil component in the first rubber composition with respect to 100 parts by mass of a rubber component, and a maximum rubber thickness of the base rubber layer is in a range of from 1.1 to 1.4 times a maximum rubber thickness of the shoulder rubber layers.

* * * * *